US007719464B2

(12) United States Patent
Pande et al.

(10) Patent No.: US 7,719,464 B2
(45) Date of Patent: May 18, 2010

(54) SYSTEM AND METHOD FOR PROVIDING AIDED GPS POSITIONING VIA SATELLITE DIGITAL RADIO SYSTEM

(75) Inventors: Ashutosh Pande, Noida (IN); Steve Chang, San Jose, CA (US); Lars Boeryd, Rancho Santa Margarita, CA (US)

(73) Assignee: SiRF Technology, Inc., San Jose, CA (US)

( * ) Notice: Subject to any disclaimer, the term of this patent is extended or adjusted under 35 U.S.C. 154(b) by 90 days.

(21) Appl. No.: 11/589,668

(22) Filed: Oct. 30, 2006

(65) Prior Publication Data

US 2007/0103365 A1  May 10, 2007

Related U.S. Application Data

(60) Provisional application No. 60/731,208, filed on Oct. 28, 2005.

(51) Int. Cl.
*G01S 5/14* (2006.01)
(52) U.S. Cl. .............................. 342/357.09; 342/357.15
(58) Field of Classification Search ............ 342/357.09, 342/357.1, 357.15
See application file for complete search history.

(56) References Cited

U.S. PATENT DOCUMENTS

2002/0102992 A1* 8/2002 Koorapaty et al. .......... 455/456
2003/0122711 A1* 7/2003 Panasik et al. .............. 342/464
2005/0122260 A1* 6/2005 Dunas et al. ........... 342/357.09
2005/0131636 A1* 6/2005 Derambure et al. ......... 342/450
2006/0194562 A1* 8/2006 Marrah et al. ............... 455/334
2007/0046532 A1* 3/2007 Bucknor et al. ........ 342/357.09
2007/0132635 A1* 6/2007 Dockemeyer et al. .. 342/357.09

OTHER PUBLICATIONS

M. Karaliopoulos et al., Satellite radio interface and radio resource management strategy for the delivery of multicast/broadcast services via an integrated satellite-terrestrial system, IEEE Communications Magazine, vol. 42(9), p. 108-117, Sep. 2004.*
F. Davarian, Sirius Satellite Radio: Radio entertainment in the sky, IEEE Aerospace Conference Proceedings, vol. 3, p. 1031-1035, 2002.*

* cited by examiner

*Primary Examiner*—Thomas H Tarcza
*Assistant Examiner*—Fred H Mull
(74) *Attorney, Agent, or Firm*—K&L Gates LLP

(57) ABSTRACT

A system and method for providing aiding information to a satellite positioning system ("SPS") receiver. A digital satellite radio system satellite receives aiding information communicated from a positioning system. The digital satellite radio system broadcasts the aiding information in the data signals it broadcasts to its subscribers. The subscribers receive the aiding information at satellite radio receivers and communicate the aiding information to the SPS receiver. The data signals may also be communicated to terrestrial repeaters for re-broadcast at a higher power. The terrestrial repeaters may input a transmitter identifier to permit the satellite radio receiver to determine a geographical location of the terrestrial repeater as its own.

21 Claims, 9 Drawing Sheets

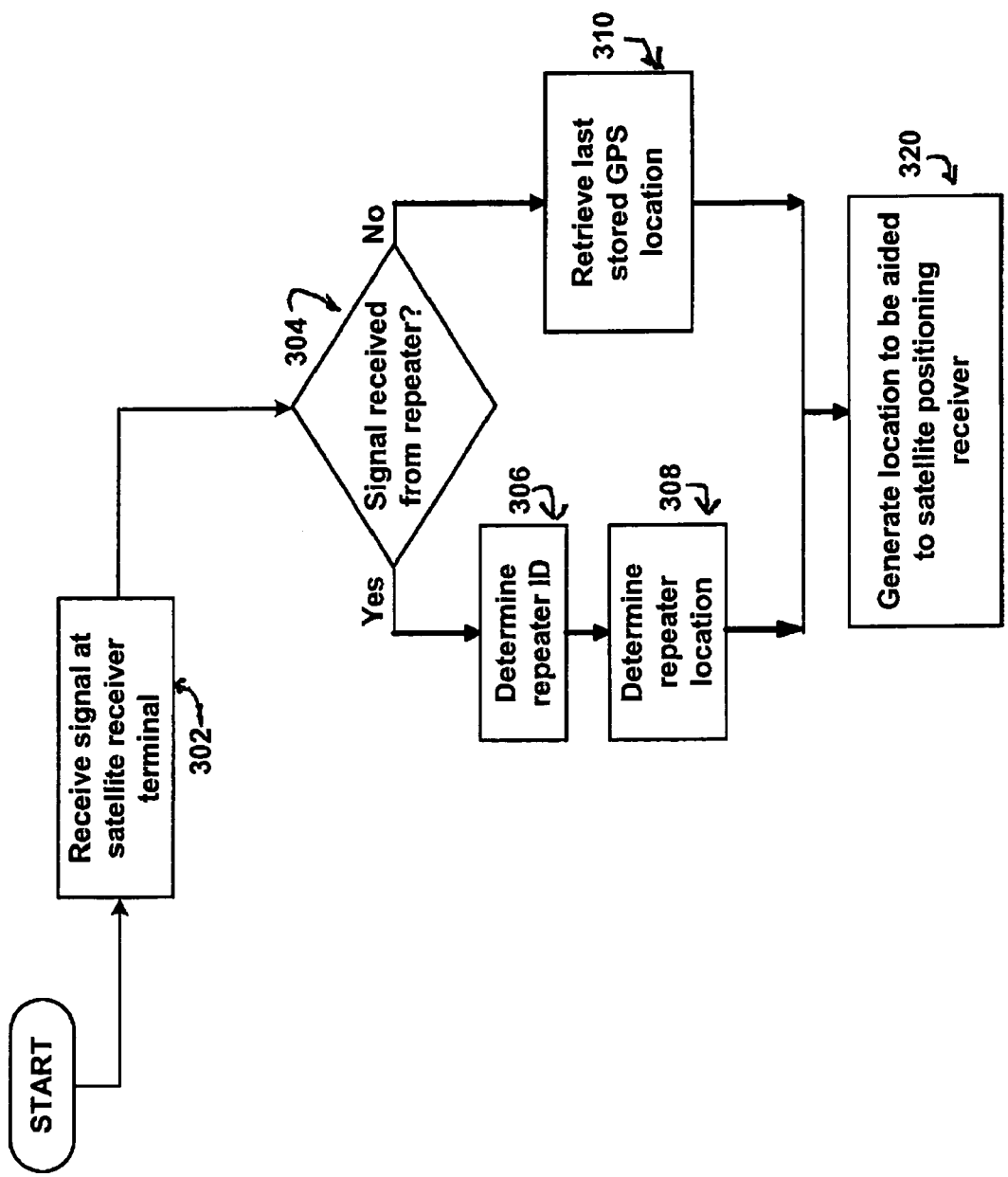

SYSTEM AND METHOD FOR PROVIDING AIDED GPS POSITIONING VIA SATELLITE DIGITAL RADIO SYSTEM

RELATED APPLICATIONS

This application claims priority of U.S. Provisional Application Ser. No. 60/731,208 filed on Oct. 28, 2005, titled "A-GPS Positioning Systems," which is incorporated by reference in this application in its entirety.

BACKGROUND OF THE INVENTION

1. Field of the Invention

The present invention relates to positioning systems, and more particularly to aiding positioning systems.

2. Description of Related Art

Satellite positioning systems, such as Global Navigation Satellite Systems ("GNSS") and Global Positioning Systems (GPS), have fostered the development of a wide variety of applications, ranging from navigation systems in mobile units (e.g. automobiles, mobile telephones, etc.), to the E911 emergency system, which requires the ability to locate callers on mobile telephones. The growth of applications that use positioning systems, both in terms of number and sophistication, has placed increasing demands on satellite positioning system ("SPS") performance.

One problem with satellite positioning systems that continues to draw attention is that positioning capabilities become increasingly limited as the lines of sight to satellites are reduced. In urban areas with large buildings, signals reflect off the buildings creating multiple signals taking different paths to SPS receivers. The SPS receivers may not be able to communicate with enough SPS satellites to determine a location, or at least to do so with enough precision. In large buildings, there may be no lines of sight to SPS satellites making it very difficult for positioning receivers to precisely determine their location.

Another problem relates to how a SPS receiver "finds" itself once the SPS receiver has been left unused and then moved to a different location. SPS receivers constantly update their location during operation. When a SPS receiver is not used, then moved to a different location, it must "wake up" and determine its new location. When the SPS receiver is restarted, it begins the process of determining its new location by searching for available SPS satellites.

Each SPS satellite generates and broadcasts its own 1023-bit Pseudo Random Noise (PRN) codes, these are pseudo random sequences that a SPS receiver knows about and tries to match by generating that same signal in order to identify a particular satellite. SPS receivers also encode the time a signal is being transmitted. The SPS receiver searches for this signal in terms of time (the signal is transmitted at 1023 Mbits/sec) and frequency (added Doppler effect from the satellite movement). Each satellite sends its PRC (Pseudo Random Code), position and the current time 50 times per second. After locking up a signal, the SPS receiver receives this data and calculates the time difference from when the signal was sent to the Time of Arrival (TOA). Included among the data received at this time are the almanac and ephemeris.

On a "cold start" (i.e. the SPS receiver lacks any ephemeris data) the SPS receiver knows where to search for a satellite in the sky based on the almanac data available and will try to obtain ephemeris data from each visible satellite. Satellites broadcast their ephemeris data every 30 seconds. If the SPS receiver is blocked while trying to obtain the data, it will have to start over in the next cycle. On a "warm start" some ephemeris is already available and the receiver can almost "guess" its position and in a "hot start" the receiver has almost all of it readily available. This whole process can translate in minutes or seconds of wait time depending in the kind and quality of data available for a SPS receiver to obtain a fix.

Mechanisms for assisting SPS receivers in lowering their time to first fix ("TTFF") have been implemented. For GPS systems, these mechanisms include "Assisted GPS" and "Aided GPS." Aided GPS is generally understood to involve ephemeris or almanac data aiding. Assisted GPS uses data from a wireless network infrastructure, sometimes down to location information itself based on the Cell ID from a mobile phone.

In one example of an aided GPS system, a gateway to a telecommunications system may be used to maintain continuously updated ephemeris and almanac data for nearby GPS satellites. In a cold start, a GPS receiver may request ephemeris data from the gateway via a request to the telecommunications system. Although such an aided GPS system may improve TTFFs in some implementations, the need to make a request still takes time that may add significantly to the TTFF.

There is a need for aided positioning systems that further reduce the time for GPS receivers to acquire ephemeris data.

SUMMARY

In view of the above, examples of systems and methods for providing aiding information to a SPS receiver are provided. The systems and methods may include a digital radio satellite configured to broadcast digital radio programming and aiding information to a satellite radio receiver. The systems and methods may also include an SPS receiver interface operating in the satellite radio receiver to retrieve the aiding information and to communicate the aiding information to the SPS receiver. A terrestrial repeater may receive the data signals and input a transmitter identifier that the SPS receiver may use to determine the geographical location of the terrestrial repeater.

Various advantages, aspects and novel features of the present invention, as well as details of an illustrated embodiment thereof, will be more fully understood from the following description and drawings.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 3 is a flowchart of a process for using data received from a repeater such as the terrestrial repeater illustrated in FIG. 2A.

DETAILED DESCRIPTION

In the following description of preferred embodiments, reference is made to the accompanying drawings that form a part hereof, and which show, by way of illustration, specific embodiments in which the invention may be practiced. Other embodiments may be utilized and structural changes may be made without departing from the scope of the present invention.

The following references are hereby incorporated by reference in their entirety: U.S. Pat. No. 6,389,291, Issued May, 14, 2002, titled "Multi-Mode Global Positioning System for Use with Wireless Networks," Pande et al.; U.S. Pat. No. 6,427,120 B1, Issued Jul. 30, 2002, titled "Information Transfer in a Multi-Mode Global Positioning System Used with Wireless Networks," Garin et al.; U.S. Pat. No. 6,519,466 B2, Issued Feb. 11, 2003, titled "Multi-Mode Global Positioning System for Use with Wireless Networks," Pande et al.; U.S. Pat. No. 6,542,823 B2, Issued Apr. 1, 2003, titled "Information Transfer in a Multi-Mode Global Positioning System Used with Wireless Networks," Garin et al.; U.S. Pat. No. 6,915,208 B2, Jul. 5, 2005, titled "Information Transfer in a Multi-Mode Global Positioning System Used With Wireless Network," Garin et al.; U.S. Pat. No. 6,684,158, Issued Jan. 27, 2004, titled "Method for Aiding a Global Positioning System," Garin et al.; and U.S. patent application Ser. No. 11/185,533, filed Jul. 20, 2005, titled "Aided Location Communication System," Pande et al.

In the following description, examples are described with reference to GPS systems as an example of a Satellite Positioning System ("SPS") in which example systems and methods consistent with the present invention may be advantageously implemented. Those of ordinary skill in the art will appreciate that the scope of the invention is not limited to use in GPS systems.

Figure 1:
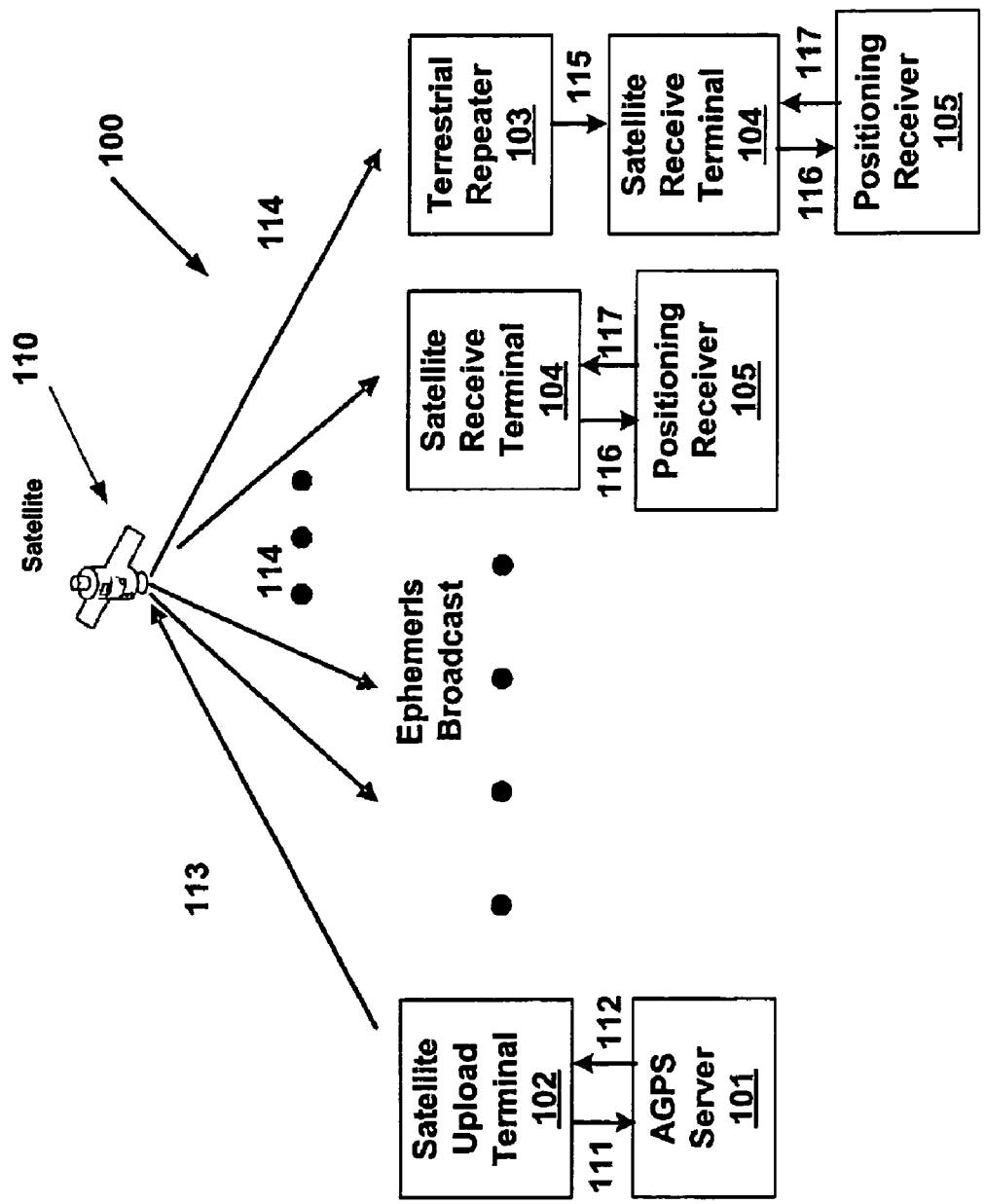
FIG. 1 is a block diagram of an example of a system for aiding a positioning system consistent with the present invention.

FIG. 1 is a block diagram of an example of a system for aiding a positioning system 100 in which a satellite 110 continuously broadcasts ephemeris data. The system 100 includes an Aided GPS server ("AGPS server") 101, a satellite upload terminal 102, a satellite receiver terminal 104, a positioning receiver 105, and at least one terrestrial repeater 103. The satellite 110 may be any satellite that continuously, or periodically, broadcasts data that includes time and ephemeris data. The satellite 110 may be used to deliver a service to subscribers of the service. Examples of services provided by the satellite 110 include any service in which the satellite 110 broadcasts data. In the example shown in FIG. 1, a subscriber may receive the service at the satellite receiver terminal 104 via the communication link 114. In examples described in more detail below, the satellite 110 is of a type that is used in broadcasting digital satellite radio programming to satellite receiver terminals 104. Examples of satellite radio systems include XM™ and Sirius™.

Those of ordinary skill in the art will appreciate that, although examples of systems described in this specification refer to GPS positioning systems, the invention is not limited to implementation in a GPS positioning environment. Any other positioning system (such as GNSS) may be used as well.

The AGPS Server 101 may be a server connected to a positioning service to collect reference time, Ephemeris and Almanac data from one or multiple GPS receivers or from a GPS global reference feed network. The reference time, ephemeris and Almanac data are used as aiding data that is communicated to the aiding system. The ephemeris data could be real time or predicted/synthesized ephemeris data. The AGPS server 101 manages the process of collecting GPS data from reference data feeds and/or the synthesized ephemeris in the server. The ephemeris data may also include extended ephemeris data, which is valid longer than ephemeris data (i.e. as long as seven days). The AGPS server 101 may also validate the GPS data before generating and formatting the broadcast Ephemeris and Almanac data transmissions. The AGPS server 101 may also send broadcast data to satellite upload terminal 102 via communication link 112 on a periodic basis. Examples of AGPS servers 101 include a SiRFLoc server from SiRF Technologies, Inc., or another suitable device.

The satellite upload terminal 102 receives the time, ephemeris and almanac data from the AGPS server 101 and manages the uploading of the time, ephemeris and almanac data to the satellite 110 via the communication link 113. The satellite upload terminal 102 may communicate with the AGPS server 101 over any suitable data links 111 and 112. Examples of types of data links for 111 and 112 that may be used include TCP/IP, RS-232, Bluetooth™, and any other suitable type of data link. The satellite upload terminal 102 employs a satellite uplink 113 using a data format as required by the service provided by the satellite 110. Such a data format would advantageously be the same as the data format used in the satellite 110 downlinks used to broadcast its service. Examples of a data format that may be used are described below with reference to FIG. 5.

The terrestrial repeater 103 receives signals from the satellite 110 via the satellite downlink 114 and re-broadcasts the signals at a power level that would permit the re-broadcast signal to penetrate walls, concrete, and metal structures that may otherwise block the satellite signal. The terrestrial repeater 103 allows the receivers to receive satellite signals indoors in most major metropolitan areas. The terrestrial repeater 103 in FIG. 1 has a fixed location. When the receivers receive signals from the terrestrial repeater 103, the data in the signals may include position information that the receiver may use as an approximate position. In one example, the position information includes an identifier that identifies the specific terrestrial repeater 103 to enable retrieval of its location information from a service or database.

The satellite receiver terminal 104 in FIG. 1 is the subscriber unit for the service provided by the satellite 110. For example, in a satellite radio system, the satellite receiver terminal 104 is a satellite radio receiver. The satellite and the satellite receiver terminal 104 implement a data connection over which the satellite 110 communicates radio programming material and other data used in the radio service. In the example shown in FIG. 1, this data includes aiding time and ephemeris data that the satellite 110 receives from the AGPS server 101 via the satellite upload terminal 102. The satellite receiver terminal 104 receives and decodes the satellite signal data. The satellite receiver terminal 104 may also receive signals from the terminal repeater 103 via the communication link 115. When the satellite receiver terminal 104 receives data, it determines whether it is re-broadcasted signals from a repeater or directly received signals from the satellite 110 via the satellite downlink 114. If the signal was received from the terminal repeater 103, the satellite receiver terminal 104 generates an approximate position for the subscriber unit. In examples of the system such as an example described below, the approximate position is determined from data in the signal received from the terminal repeater 103. If the signal came directly from the satellite 110, the satellite receiver terminal 104 provides aided GPS data that includes ephemeris, almanac, approximate position and local time to the positioning receiver 105 via the communication link 116. The satellite receiver terminal 104 may also receive a position calculated by the positioning receiver 105 via the communication link 117 and use it to send to the satellite 110 to enable local application content (e.g. local radio programming).

The positioning receiver 105 in FIG. 1 may be any SPS receiver operating in any device that advantageously uses positioning services. For example, the positioning receiver 105 may include a GPS client, which may compute its position using the GPS data from the GPS satellites, and which may use aiding information broadcast by the satellite 110 to find itself and/or reset its positioning capabilities. The positioning receiver 105 may be an embedded component integrated within the satellite receiver terminal 104. If it is not embedded with the satellite receiver terminal 104, positioning receiver 105 may communicate with the satellite receiver terminal 104 over any suitable data links 116 and 117. Examples of types of data links 116 and 117 that may be used include TCP/IP, RS-232, Bluetooth™, and any other suitable type of data link. Examples of devices that may contain the positioning receiver 105 include mobile telephones, Personal Digital Assistants ("PDA"), handheld computers, laptop computers, automobiles, etc.

Figure 2A:
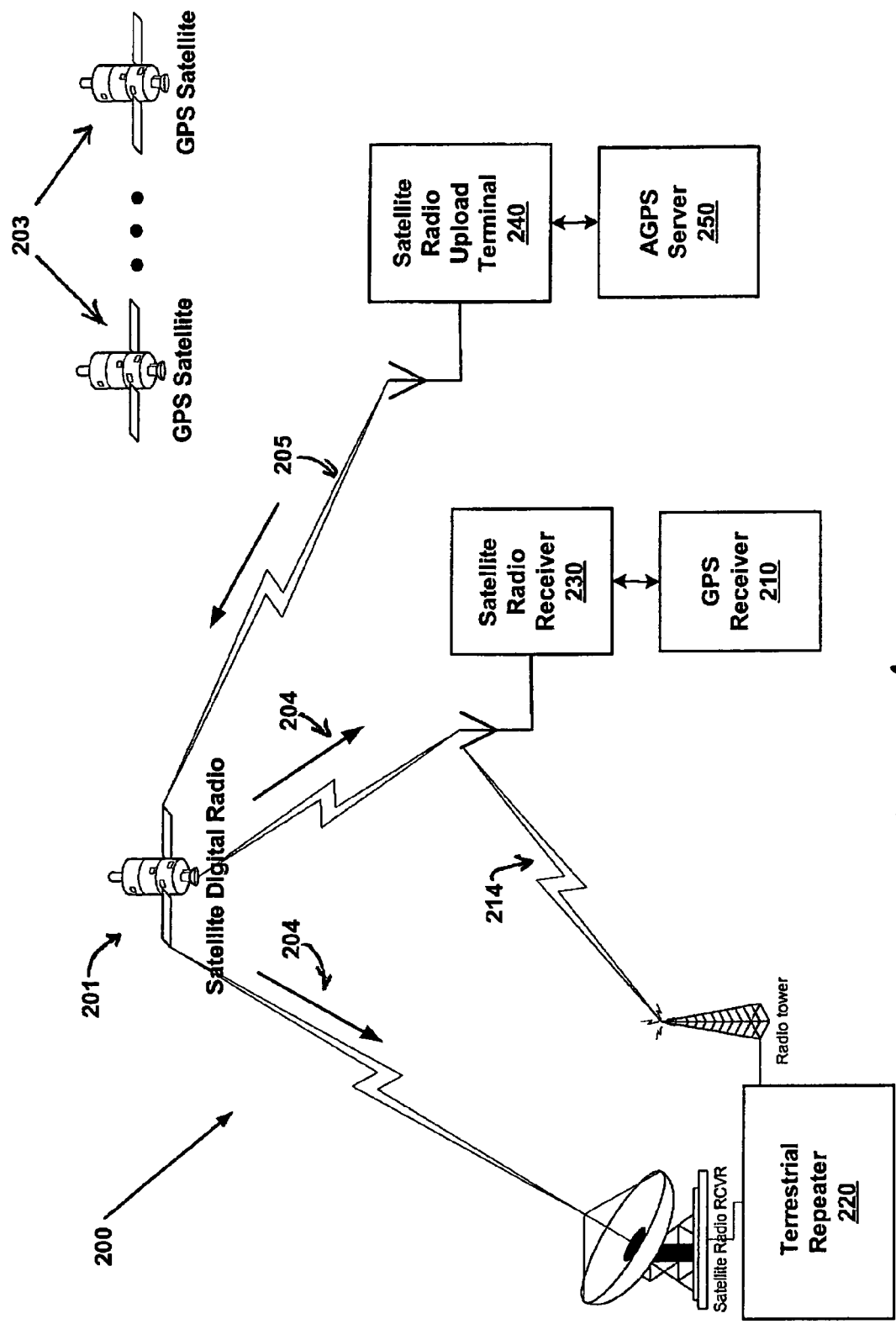
FIG. 2A is a block diagram of an example of a system for aiding a positioning system that uses satellite digital radio.

FIG. 2A is a block diagram of an example of a system 200 for aiding a positioning system that uses a satellite digital radio system to broadcast aiding data. The system 200 in FIG. 2 includes a digital radio service satellite 201, GPS satellites 203, a terrestrial repeater 220, a satellite radio receiver 230, a GPS receiver 210, a satellite radio upload terminal 240, and an AGPS server 250. The GPS receiver 210 may be a mobile device with a built in GPS module, such as a Personal Digital Assistant ("PDA"), a handheld computer, a laptop, a mobile phone, a portable navigation device, or any other mobile device configured for operation in a GPS system via GPS satellites 203. The GPS receiver 210 may also be a component in an automobile either connected to, or integrated with the satellite radio receiver 230. The GPS receiver 210 may also be integrated within a portable satellite radio receiver 210.

The radio service satellite 201 receives aiding data from the satellite radio upload terminal 240 over a satellite communications link 205. The satellite radio terminal 240 receives the aiding data from an AGPS server 250, which periodically updates and stores the aiding data through periodic communications with one or multiple GPS receivers or from a GPS global reference feed network.

The radio service satellite 201 continuously, or periodically, broadcasts the aiding data over communications links 204 to the satellite radio receiver 230. The terrestrial repeater 220 adds a transmitter identifier to the data it receives from the radio service satellite 201 to uniquely identify the terrestrial repeater 220 as the sender to the data signal, then re-broadcasts the signal at a higher power via a radio transmitter over re-broadcasted communication links 214. The satellite radio receiver 230 may thus receive the data with the transmitter identifier and use the transmitter identifier to retrieve a location of the terrestrial repeater 220. This terrestrial repeater location may be used by the positioning receiver 210 as an approximate location during a cold restart for example.

When the satellite radio receiver 230 receives a data signal, the satellite radio receiver 230 determines whether the data signal was received directly from the radio service satellite 201 or from the terrestrial receiver 220. If the data signal was received from the terrestrial repeater 220, the satellite radio receiver 230 determines its current approximate geographical location based on the transmitter identifier in the data received from the repeater 220. The current approximate location is then stored in memory and may be made available to the GPS receiver 210, which may use the current approximate location in a cold or warm restart. If the data signal was received from the digital radio satellite 201, the satellite radio receiver 230 retrieves the aiding information in the data signal. The aiding information may include ephemeris and almanac data, which may also be made available to the GPS receiver 210 to allow the GPS receiver 210 to search for and lock on GPS signals from GPS satellites 203.

In some examples, the satellite radio receiver 230 and the GPS receiver 210 may use a protocol or predetermined system for communicating requests and responses relating to location information. The satellite radio receiver 230 receives a transmitter identifier from a terrestrial repeater to determine a current approximate location. The satellite radio receiver 230 also receives aiding information in the form of ephemeris, timing and almanac data from the satellite 201. When the GPS receiver 210 needs to find itself in a cold start, the GPS receiver 210 may obtain the current approximate location and the ephemeris, timing and almanac data from the satellite radio receiver 230. The satellite radio receiver 230 may provide the current approximate location, ephemeris, timing and almanac data to the GPS receiver 210 as it receives the data via its links to the satellite 201 and repeaters 220.

When the satellite radio receiver 230 receives data from the satellite directly, the satellite radio receiver 230 may extract the ephemeris, timing and almanac data and send it to the GPS receiver 210. The satellite radio receiver 230 may include the last stored approximate location that it received from the last transmission it received from the repeater 220. When the satellite radio receiver 230 receives data from the repeater 220, it may retrieve the transmitter identifier from the data, and use the transmitter identifier to obtain the location of the repeater 220. The satellite radio receiver 230 sets its current approximate location to be the same as the location of the repeater 220. The satellite radio receiver 230 may then communicate the current approximate location (i.e. the location of the repeater 220) to the GPS receiver 210.

The satellite radio receiver 230 may communicate all aiding information available each time it receives any data from either the satellite 201 or repeater 220. The satellite radio receiver 230 may also communicate only aiding information that is updated in data received from the satellite 201 or repeater 220. The satellite radio receiver 230 may also maintain the aiding information and provide it to the GPS receiver 210 upon request.

Figure 2B:
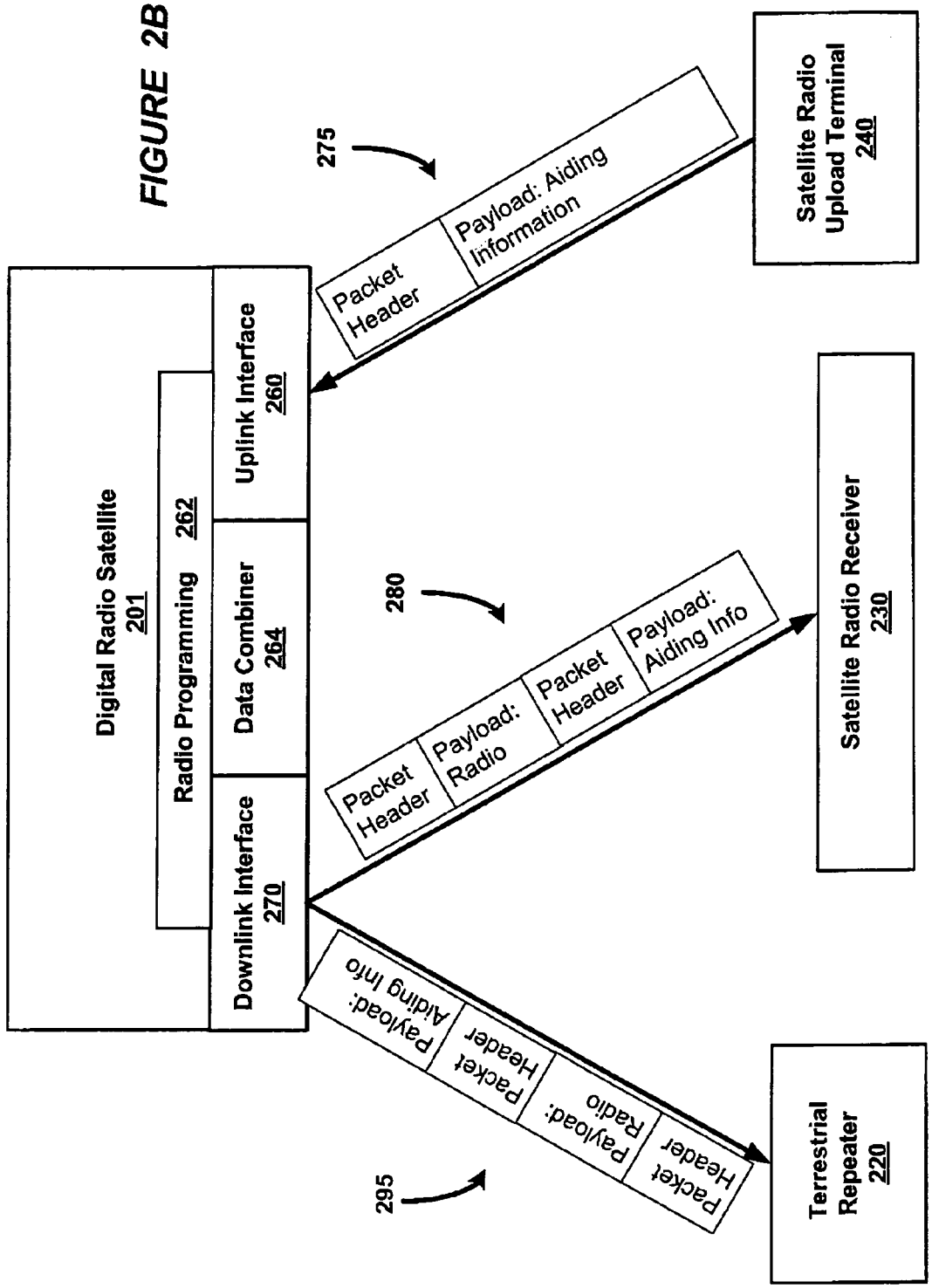
FIG. 2B is a block diagram of an example of a digital radio satellite.

FIG. 2B is a block diagram of the digital radio satellite 203 of FIG. 2A. The digital radio satellite 203 includes an uplink interface 260, a radio programming function 262, a data combiner 264 and a downlink interface 270. The uplink interface 260 communicates with the satellite upload terminal 240 to receive aiding information provided by the AGPS 250. In one example, the satellite upload terminal 240 may communicate the aiding information in packets, such as uplink packet 275 having a packet header and a packet payload containing the aiding information. In the digital radio satellite 201 the data combiner 264 arranges the aiding information and the radio programming data from the radio programming function 262. The packets containing the aiding information may be maintained in the same format as received and directed to the downlink interface 270 for communication with packets containing the radio programming in a first stream of packets 280 to the satellite radio receiver 230, or a second stream 295 to the terrestrial repeater 220. In other examples, the aiding information data may be organized differently, for example, by including the aiding information in the payload with the radio programming. Those of ordinary skill in the art will appreciate that FIG. 2B illustrates examples of uplink and downlink interfaces at a data service satellite using the digital radio satellite as the example. Other types of data service satellites and data formatting may be used as well.

FIG. 3 is a flowchart depicting a process performed by the satellite radio receiver 230 in FIG. 2A for determining its location. The process begins after the data signal is received at the satellite receiver terminal (shown at 230 in FIG. 2A) at step 302 in FIG. 3. The satellite receiver terminal 230 determines if the signal came from the terrestrial repeater 220 at decision block 304. If the signal came from the terrestrial repeater 220, the data signal is analyzed to determine the transmitter identifier at step 306. Once the transmitter identifier has been determined, the location of the terrestrial repeater 220 may be determined at step 308. The satellite receiver terminal 230 may include a database having records containing information such as the information in Table 1. The transmitter identifiers are shown mnemonically in Table 1. The actual identifier type may be any suitable uniquely identifying parameter, such as an IP address, serial number, or any other identifying alphanumeric sequence. The repeater coordinates are the geographical coordinates of the terrestrial repeater 220 from which the data was received.

TABLE 1

| Transmitter Identifier | Repeater Coordinates |
|---|---|
| REPEATER1 | $X_1, Y_1, Z_1$ |
| REPEATER2 | $X_2, Y_2, Z_2$ |
| REPEATER3 | $X_3, Y_3, Z_3$ |
| REPEATER4 | $X_4, Y_4, Z_4$ |

At step 308, the satellite receiver terminal 230 may obtain its location as the terrestrial repeater's location by matching the repeater's identifier with the transmitter identifier in Table 1 and retrieving the corresponding repeater coordinates. The location of the satellite receiver terminal 230 may then be designated to be the location of the terrestrial repeater 220 at step 320. As described above, the location of the satellite receiver terminal 230 may be provided to the GPS receiver 210. The satellite receiver terminal 230 may send the current approximate location each time it is updated. Alternatively, the satellite receiver terminal 230 may store it and provide it to the GPS receiver 210 when the GPS receiver 210 is attempting to establish its current location such as during a cold or warm restart.

If at decision block 304 the data signal was not received from the terrestrial repeater 220, then the satellite receiver terminal 230 retrieves the last GPS location stored at step 310. At step 320, the satellite receiver terminal 230 uses the last position stored as its approximate location. The satellite receiver terminal 230 may send the last position stored to the GPS receiver 210 along with any aiding information received in the data signal from the satellite 201.

Figure 4:
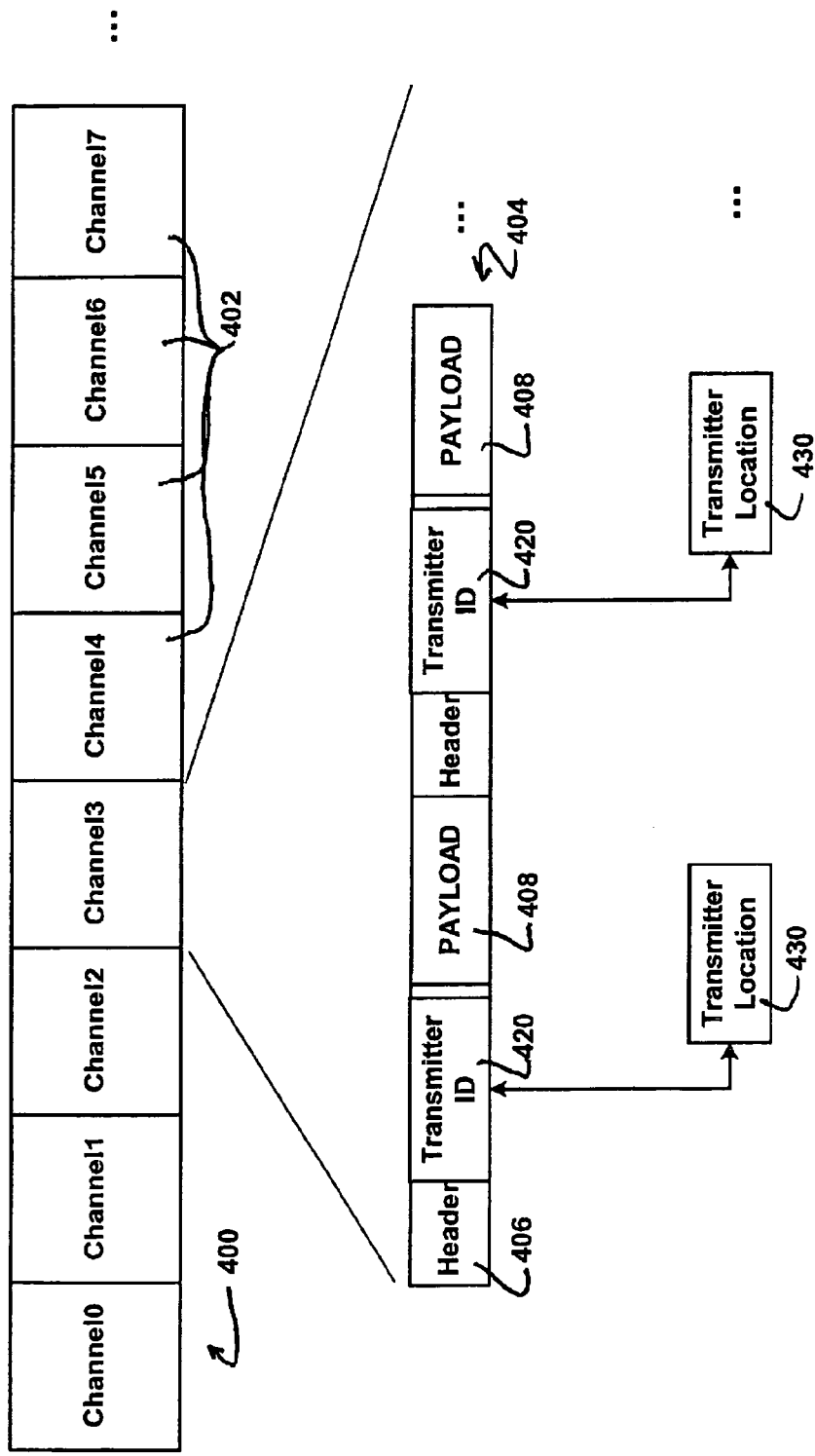
FIG. 4 illustrates an example format that may be used for data transmitted by a repeater such as the terrestrial repeater illustrated in FIG. 2A.

The process shown in the flowchart of FIG. 3 includes a step (step 306) of determining a transmitter (or repeater) identifier. The transmitter identifier may be embedded in data containers in the data signal. The data containers are defined by the format of the data signal. In one example shown in FIG. 4, the data signal is communicated as a plurality of time-domain multiplexed (TDM) channels 402. Each channel 402 includes a plurality of multiplexed data packets 404, each of which includes a header 406 and a payload 408. The payload 408 includes the data being carried by the data signal, which in the example in FIG. 4 the data would include radio programming data.

The data signal 400 transmitted by the terrestrial repeaters 220 also includes a transmitter identifier 420. In one example, the transmitter identifier 420 is embedded after an MCM synchronization signal in the header 406. The terrestrial repeater 220 may demodulate the data signal received from the radio service satellite 201, and then decode and re-format the demodulated bit stream data. During reformatting, the transmitter identifier 420 is added to the header 406 portion of the packet 404. The satellite radio receiver 230 may then, upon receipt of the data signal, retrieve the transmitter identifier 420 from the data signal. The satellite radio receiver 230 may then obtain the location of the terrestrial repeater using the transmitter identifier in the data signal. In one example, the satellite radio receiver 230 includes a database (or, a lookup table) as described above with reference to FIG. 3 and Table 1. This database may include transmitter identifiers and the locations corresponding to the terrestrial repeaters used by the digital satellite radio service. The database may be expanded to include aiding data specific to the location of the repeater, or other information that would increase the precision of the aiding information available to the satellite receiver 230. The database may be built into the radio receiver, or provided during provisioning, or in a DVD, or some other suitable format. In another example, the terrestrial repeater location may be obtained by request from a server (not shown). The database may be included in a satellite downlink. The database may also be created and developed by the satellite receiver 230 using historical data acquired during operation over time. In another example, the repeater 220 may add the repeater location to the data signal (e.g. in the header or the payload).

Figure 5:
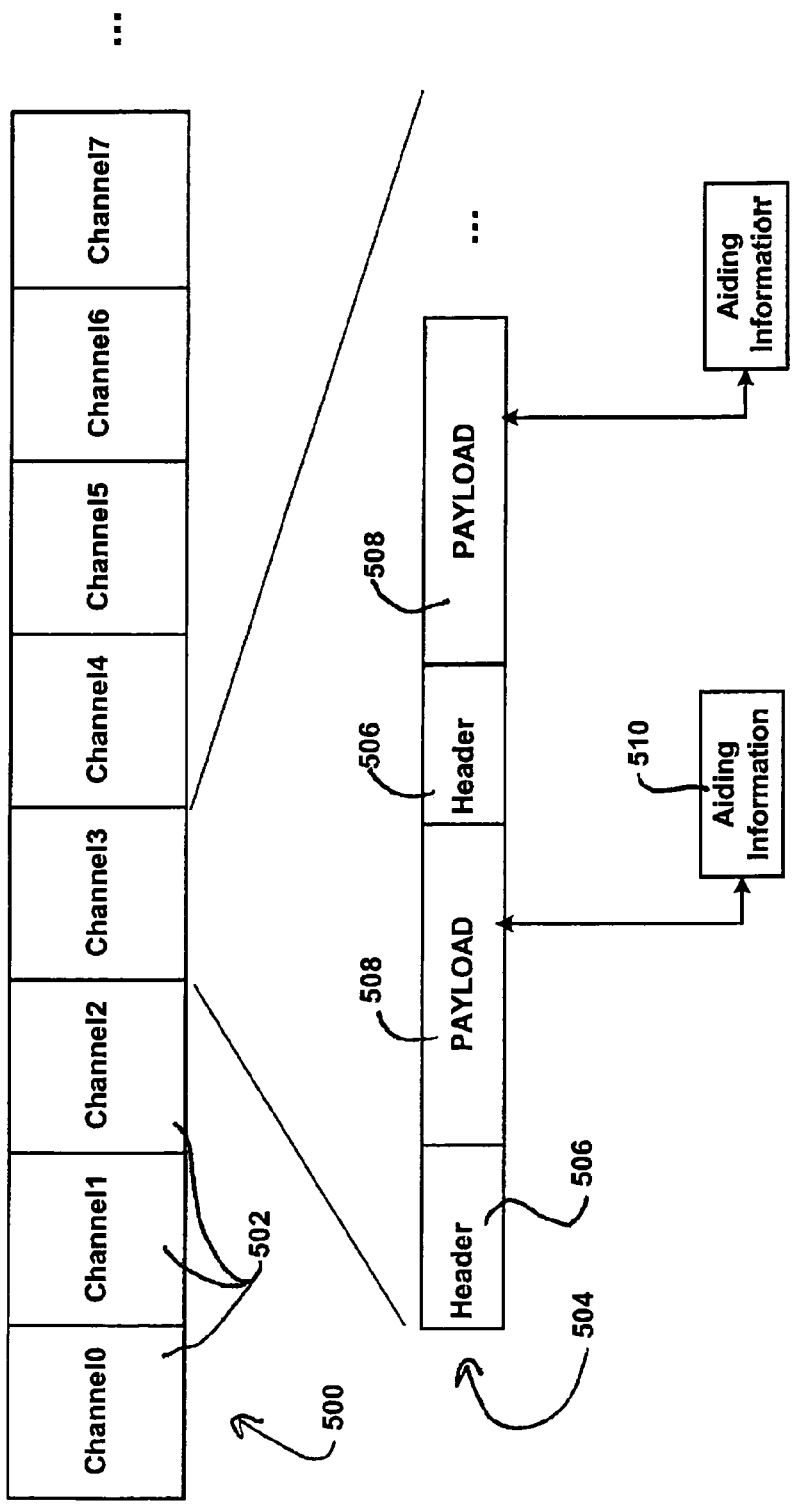
FIG. 5 illustrates an example format that may be used to broadcast aiding information from a digital radio satellite.

FIG. 5 illustrates a data format 500 that may be used by the digital satellite radio service to broadcast radio programming to its subscribers via satellite radio receivers such as the satellite receiver terminal 104 in FIG. 1. The data format 500 may be communicated as a plurality of TDM channels 502. Each channel 502 includes a plurality of multiplexed data packets 504, each of which includes a header 506 and a payload 508. The payload 508 includes the data being carried by the data signal, which in the example in FIG. 5 the data would include radio programming data. In examples of systems and methods for providing aiding information using a satellite digital radio service, the payload 508 may include aiding information 510. The packets 504 containing aiding information 510 may be generated for uplink by an interface between the positioning system and the satellite radio service. For example, the data packets 504 may be generated by the satellite uplink terminal 240 in FIG. 2A, or by the AGPS server 250 in FIG. 2A for transmission to the digital radio satellite 201 via the satellite uplink terminal 240. The packets 504 may advantageously be re-transmitted by broadcast to subscribers without re-formatting the aiding information. Those of ordinary skill in the art will appreciate that FIG. 5 illustrates just one example of a data format that may be used to communicate the aiding information. Others may be used as well.

Figure 6:
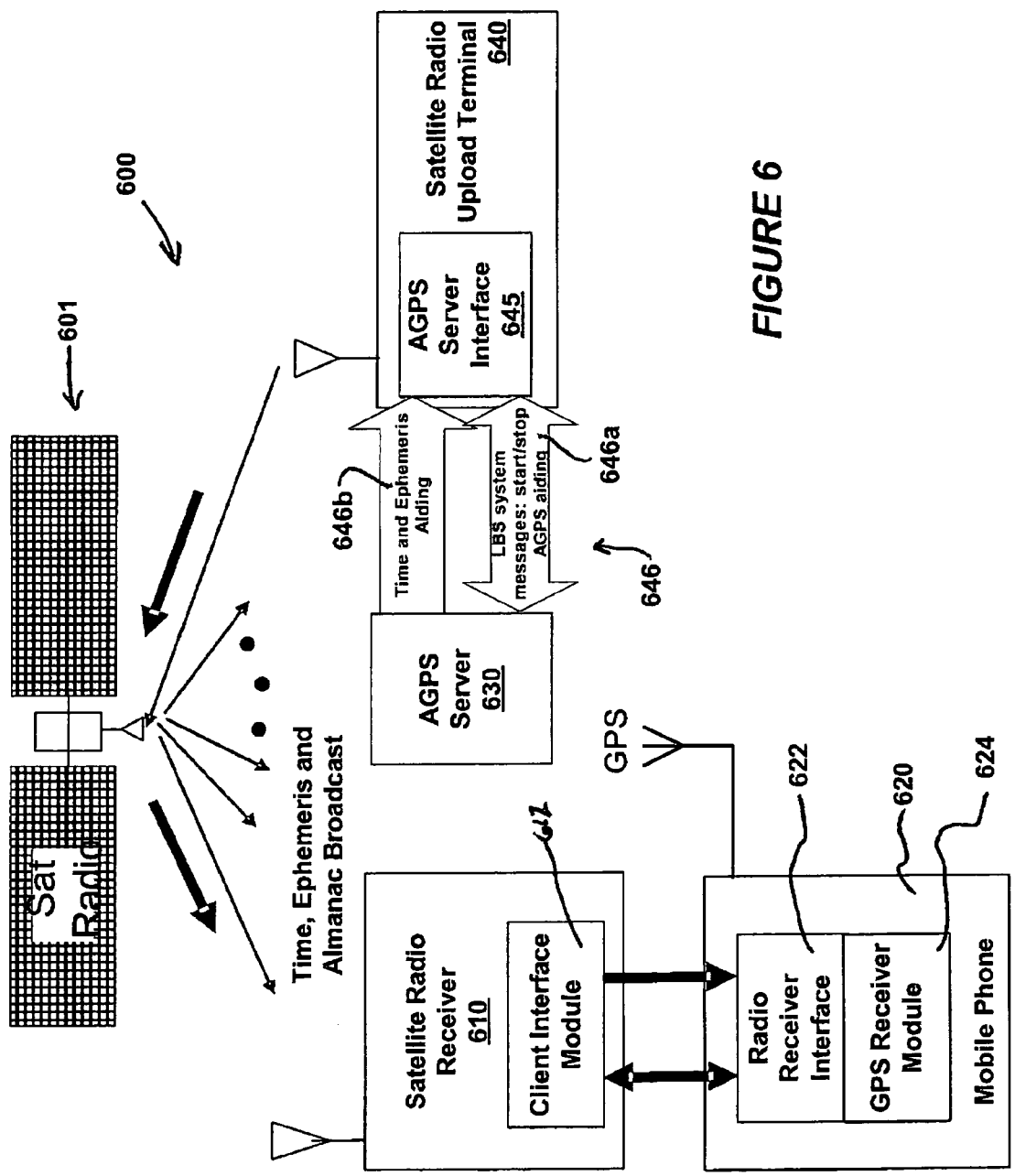
FIG. 6 is a block diagram of an example of an application that advantageously implements examples of systems and methods for providing aided GPS consistent with the present invention.

FIG. 6 is a block diagram of an example of an application that advantageously implements examples of systems and methods for providing aided GPS consistent with the present invention. The system 600 in FIG. 6 includes a radio service satellite 601, which broadcasts aiding data to a satellite radio receiver 610. The satellite radio receiver 610 communicates with a mobile phone 620, which includes a radio receiver interface 622 and a GPS receiver module 624. The mobile phone 620 may communicate wirelessly over a wireless telecommunication service (details not shown). The GPS receiver module 624 is included in the mobile phone 620 in FIG. 6 to provide the mobile phone 620 with the capability of using location-based services such as navigation applications and precise usage of E911.

The GPS receiver module 624 may operate as a client with a GPS satellite (not shown) in the positioning system. The positioning system may also implement a AGPS server 630, which communicates control and aiding data with a satellite radio upload terminal 640 at an AGPS server interface 745. An interface 646 between the AGPS server 624 and the AGPS server interface 645 in the satellite radio upload terminal 640 may include a system messages link 646a and a data link 646b. The system messages link 646a may be used to communicate control information such as requests to start and stop communicating AGPS aiding information. The data link 646b may be used to communicate the aiding information itself. The aiding information may be retrieved by the AGPS server 630 from reference data feeds and may include ephemeris, almanac and time information.

The AGPS server 630 may continuously, or periodically, update the aiding information that is sent to the satellite radio upload terminal 640. The maintenance of the aiding data may be controlled by system messages to start and stop AGPS aiding. The satellite radio upload terminal 640 receives the aiding information and communicates the aiding information to the radio service satellite 601. The aiding information may advantageously be communicated in a manner that would not require reformatting of the data in the upload because the radio service satellites 601 are continuously transmitting the aiding data.

The radio service satellite 601 in the system 600 in FIG. 6 broadcasts the time and ephemeris data to receivers, such as the satellite radio receiver 610. The satellite radio receiver 610 communicates the aiding data to the mobile phone 620 via the radio receiver interface 622. The radio receiver interface 622 may interface to the GPS receiver module 624 to request and/or receive aiding information and current approximate location information from the satellite radio receiver 610. If the mobile phone 620 is unused and then moved to a different location, its GPS receiver module 624 may perform a cold, or warm, restart using the aiding information received from the satellite radio receiver 610.

Figure 7:
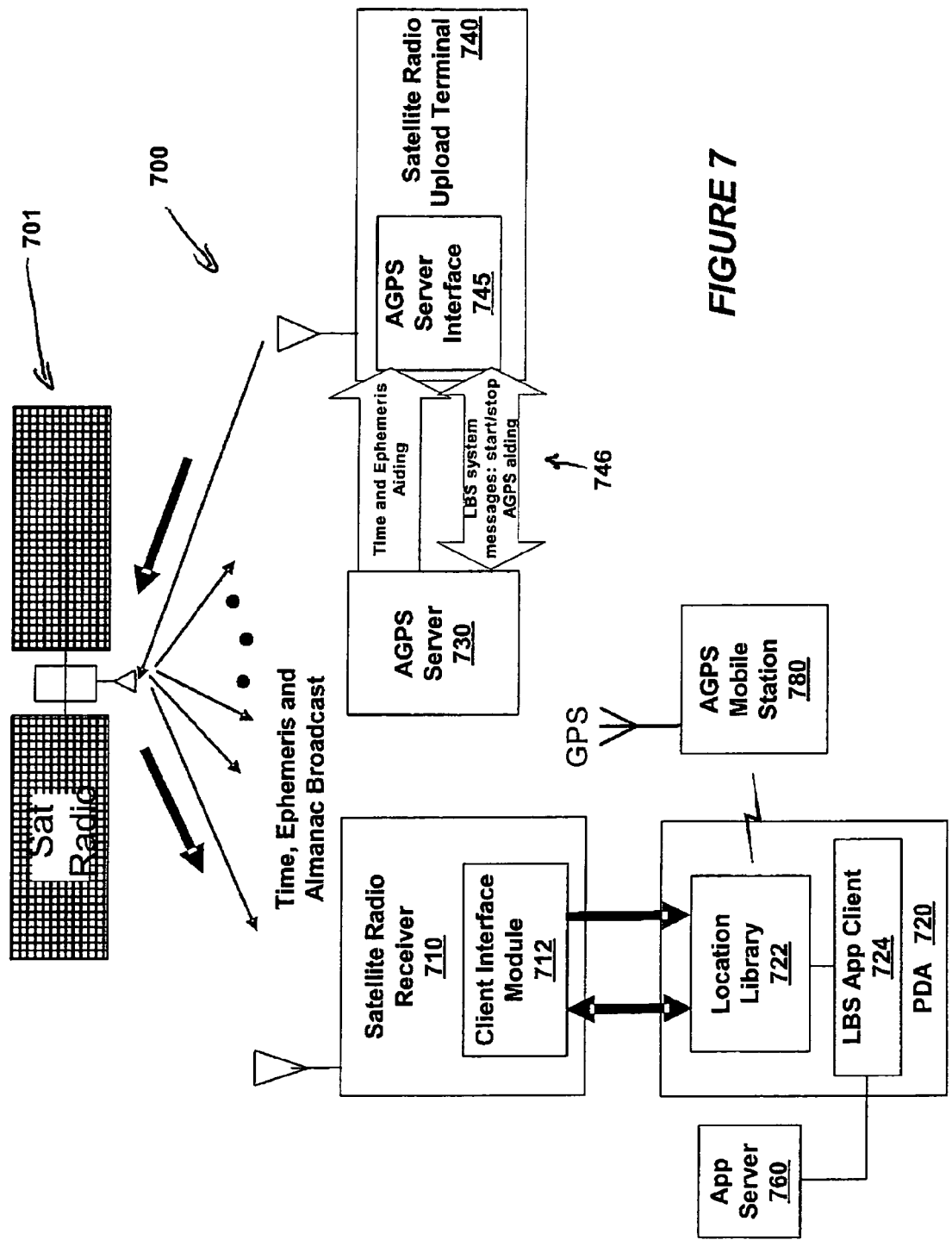
FIG. 7 is a block diagram of another example of an application that advantageously implements examples of systems and methods for providing aided GPS consistent with the present invention.

FIG. 7 is a block diagram of an example of an application that advantageously implements examples of systems and methods for providing aided GPS consistent with the present invention. The system in FIG. 7 includes a radio service satellite 701, which broadcasts aiding data to a satellite radio receiver 710. The satellite radio receiver 710 communicates with a PDA 720, which includes a location library 722 and a location-based service ("LBS") application client 724. The PDA 720 communicates with an application server 760 and with an AGPS mobile station 780. The system 700 in FIG. 7 also includes an AGPS server 730, which communicates control and aiding data with a satellite radio upload terminal 740 at an AGPS server interface 745.

The AGPS server 730 continuously updates the aiding data that is sent to the satellite radio upload terminal 740. The maintenance of the aiding data may be controlled by LBS messages to start and stop AGPS aiding. The satellite radio upload terminal 740 receives the aiding data and communicates the aiding data to the radio service satellite 701. The aiding data may advantageously be communicated in a manner that would not require reformatting of the data in the upload because the radio service satellites 701 are continuously transmitting the aiding data.

The radio service satellite 701 in the system 700 in FIG. 7 broadcasts the time and ephemeris data to receivers, such as the satellite radio receiver 710. The satellite radio receiver 710 communicates the aiding data to the PDA 720 via a client interface module 712. The client interface module 712 may include a communications link such as RS232, TCP/IP or other suitable interface to the location library 722. The location library 722 may also provide a communications link to the AGPS mobile station 780. Such a link may include Bluetooth™ for example. The location library 722 in the PDA 724 may reformat time, position and Ephemeris aiding data for the AGPS mobile station 780. The location library 722 may also use the aiding data to generate a position, which it may then provide to the LBS application client 724.

The LBS application client 724 operates in accordance with the type of function performed by the application controlled by the application server 760. In one example, the application may be a navigation system. The LBS application client 724 may wait for location data from the location library 722. The LBS application client 724 may then request and wait for map data and other information that it may use to display a map of the area that the user is in along with a map of the area and directions to a destination.

Figure 8:
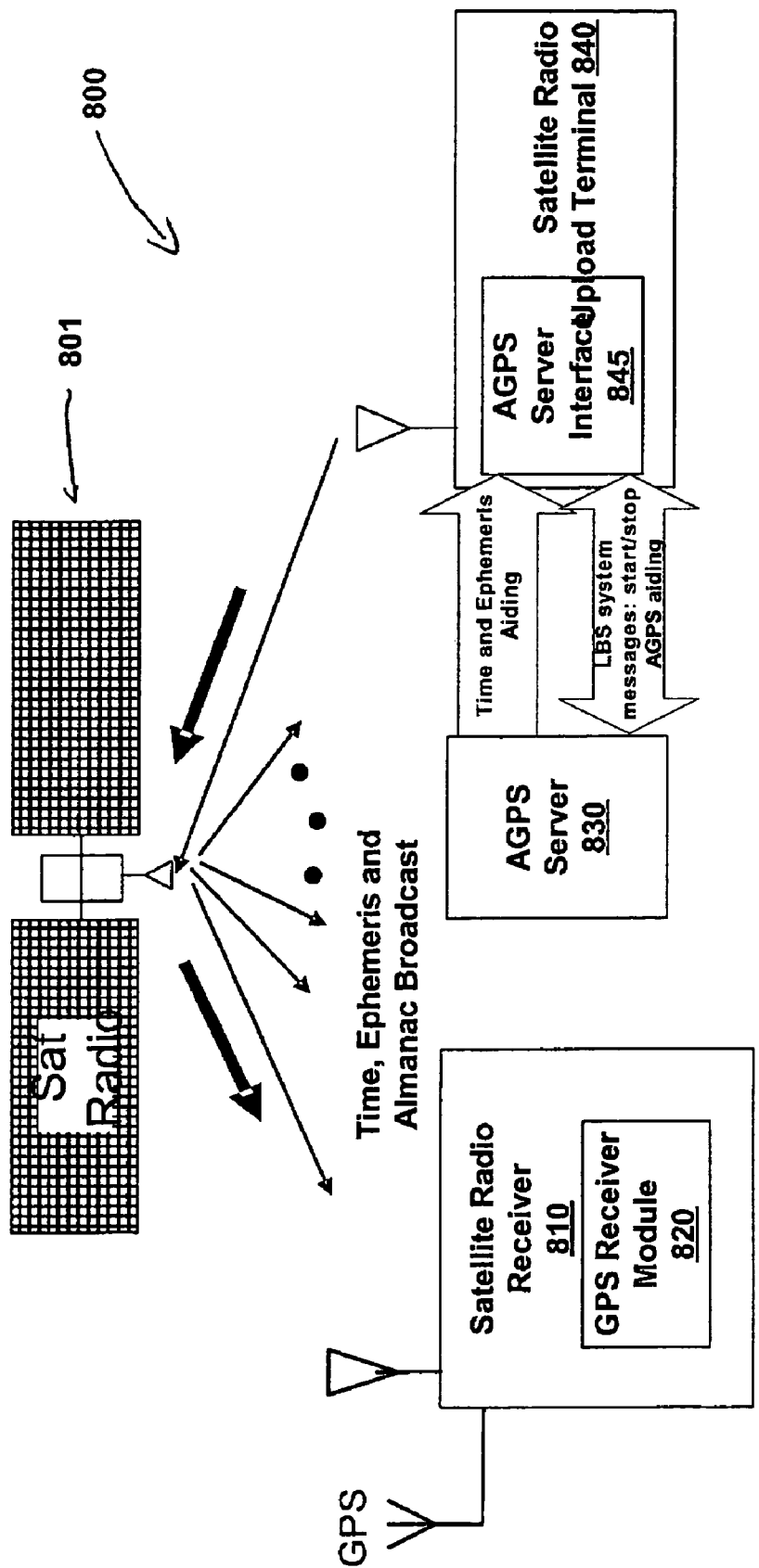
FIG. 8 is a block diagram of another example of an application that advantageously implements examples of systems and methods for providing aided GPS consistent with the present invention.

FIG. 8 is a block diagram of another example of an application that advantageously implements examples of systems and methods for providing aided GPS consistent with the present invention. The system 800 in FIG. 8 includes a radio service satellite 801, which broadcasts aiding data to a satellite radio receiver 810. The satellite radio receiver 810 includes a GPS receiver module 820. The satellite radio receiver 810 may be an integrated information system that may be used for example, in an automobile. The GPS receiver module 820 may be part of a navigation system, which may be integrated with the satellite radio receiver function.

One of ordinary skill in the art will appreciate that the methods and systems described herein may be implemented using one or more processors having memory resources available for storing program code and data. One skilled in the art will also appreciate that all or part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A method for providing aiding information to a satellite positioning system ("SPS") receiver comprising:
   receiving a first broadcasting data signal from a data service satellite;
   extracting aiding information contained in the first broadcasting data signal, wherein the aiding information was provided to the data service satellite from an aiding satellite positioning system server, and wherein the first broadcasting data signal was generated by combining the aiding information with broadcasting data by a data combiner located at the data service satellite;
   sending the aiding information to the SPS receiver to aid the SPS receiver in obtaining its location from the satellite positioning system;
   receiving a second broadcasting data signal from a terrestrial repeater;
   receiving a transmitter identifier contained in the second broadcasting data signal; and
   searching for a repeater location corresponding to the transmitter identifier.

2. The method of claim 1 further comprising:
   sending the repeater location to the SPS receiver to set a current location of the SPS receiver.

3. The method of claim 1 further comprising:
   receiving a broadcast data signal;
   determining whether the broadcasting data signal was transmitted by the data service satellite or by the terrestrial repeater;
   processing the broadcast data signal as the first broadcasting data signal if when received from the data service satellite; and
   processing the broadcast data signal as the second broadcasting data signal if when received from the terrestrial repeater.

4. The method of claim 3 further comprising:
   when the broadcast data signal is the first broadcasting data signal, retrieving a current location from a last received broadcast data signal from the terrestrial repeater; and
   sending the current location to the SPS receiver.

5. The method of claim 1 further comprising:
   receiving a second broadcasting data signal from a terrestrial repeater; and
   extracting a repeater location contained in the second broadcasting signal.

6. A method for providing aiding information to a satellite positioning system ("SPS") receiver comprising:
   receiving aiding information at a data service satellite over an uplink connection to an aiding satellite positioning system server;
   combining, by a data combiner located at the data service satellite, the aiding information with data into a data signal, the data having subscription-based content for communication to a subscriber at a receiver terminal, wherein combining the aiding information by the data combiner includes:
   receiving the aiding information in at least one data packet, and
   directing the data packet containing the aiding information to a downlink interface for transmission with data packets containing data; and
   continuously broadcasting the data signal to the receiver terminal, wherein the data signal is processed to obtain the aiding information to provide to the SPS receiver.

7. The method of claim 6, comprising:
   maintaining the packets containing the aiding information in a format that is the same as the format as received from the aiding satellite positioning system server; and
   directing to the downlink interface for transmission with the data packets containing data either in a first stream of packets to the receiver terminal, or a second stream of packets to a terrestrial repeater.

8. The method of claim 6, comprising including the aiding information in the payload of the data packet containing data.

9. A system for providing aiding information to a satellite positioning system ("SPS") receiver comprising:
   a data service satellite configured to broadcast data and aiding information to a data service receiver;
   a data combiner located at the data service satellite to combine the aiding information and the data into a data signal for broadcasting, wherein the aiding information and the data are combined at the data service satellite by the data combiner;
   an SPS receiver interface operating in the data service receiver to retrieve the aiding information from the broadcast data signal and to communicate the aiding information to the SPS receiver;
   wherein the data service satellite is a digital radio satellite, the data service receiver is a satellite radio receiver, and the data comprises radio programming;
   a terrestrial repeater operable to receive the data signals from the data service satellite and to input a transmitter identifier identifying the terrestrial repeater in the data signals, the terrestrial repeater being further operable to broadcast the data signals to the data service receiver.

10. The system of claim 9 wherein the data service receiver receives broadcast data signals and determines if the broadcast data signal is from the terrestrial repeater or from the data service satellite, the data service receiver being further operable to extract a transmitter identifier from the data signal if the signal was received from the terrestrial repeater and use the transmitter identifier to obtain a repeater location.

11. The system of 9 wherein the data service receiver receives broadcast data signals and determines if the broadcast data signal is from the terrestrial repeater or from the data service satellite, the data service receiver being further operable to extract a repeater location from the data signal if the signal was received from the terrestrial repeater.

12. A data service receiver in a satellite data service system comprising:
   a satellite communications interface to receive data signals broadcast by a data service satellite, the data signals including data associated with the data service satellite combined with aiding information, wherein the data signals were generated by combining the data associated with the data service satellite with the aiding information by a combiner located at the data service satellite;
   a satellite positioning system interface to extract the aiding information from the data signals; and
   a satellite positioning system ("SPS") receiver interface to communicate the aiding information to the SPS receiver;
   wherein the data service receiver is operable to determine if the broadcast data signal is from a terrestrial repeater or from the data service satellite, the data service receiver being further operable to extract a transmitter identifier from the data signal if the signal was received from the terrestrial repeater and use the transmitter identifier to obtain a repeater location.

13. The data service receiver of claim 12 further comprising a data storage element to store the repeater location corresponding to the transmitter identifier.

14. The data service receiver of claim 13 wherein the data storage element includes a database containing at least one transmitter identifier and the repeater location corresponding to the transmitter identifier.

15. A data service satellite for providing broadcast data signals to a data service receiver, the data service satellite comprising:
    an uplink interface to an aiding satellite positioning system server to receive aiding information;
    a data combiner located at the data service satellite to combine the aiding information with data associated with the data service satellite to be transmitted in the broadcast data signals, wherein the aiding information is combined with the data associated with the data service satellite at the data service satellite by the data combiner; and
    a downlink interface to the data service receiver to transmit the broadcast data signals having the data and the aiding information;
    wherein the data service satellite provides satellite radio programming and the data service receiver is a satellite radio receiver; and
    wherein the uplink interface receives the aiding information in data packets, the data combiner being operable to direct the data packets containing the aiding information to the downlink interface for transmission with data packets containing the data.

16. A satellite radio receiver in a digital satellite radio system comprising:
    means for receiving a first broadcasting data signal from a data service satellite;
    means for extracting aiding information contained in the first broadcasting data signal, wherein the aiding information was provided to the data service satellite from an aiding satellite positioning system server, and wherein the aiding information was combined at the data service satellite with broadcasting data by a means for combining data located at the data service satellite to generate the first broadcasting data signal;
    means for sending the aiding information to the satellite positioning system ("SPS") receiver, to aid the SPS receiver in obtaining its location from the satellite positioning system;
    means for receiving a second broadcasting data signal from a terrestrial repeater,
    means for receiving a transmitter identifier contained in the second broadcasting data signal; and
    means for searching for a repeater location corresponding to the transmitter identifier.

17. The system of claim 16 further comprising means for sending the repeater location to the SPS receiver to set a current location of the SPS receiver.

18. The system of claim 16 further comprising:
    means for receiving a broadcast data signal;
    means for determining whether the broadcasting data signal was transmitted by the digital radio satellite or by the terrestrial repeater;
    means for processing the broadcast data signal as the first broadcasting data signal if received from the digital radio satellite; and
    means for processing the broadcast data signal as the second broadcasting data signal if received from the terrestrial repeater.

19. The system of claim 18 further comprising:
    when the broadcast data signal is the first broadcasting data signal, means for retrieving a current location from a last received broadcast data signal from the terrestrial repeater; and
    means for sending the current location to the SPS receiver.

20. The system of claim 16 further comprising:
    means for receiving a second broadcasting data signal from a terrestrial repeater;
    means for extracting a repeater location contained in the second broadcasting signal.

21. A system for providing aiding information to a satellite positioning system ("SPS") receiver comprising:
    means for receiving aiding information at a data service satellite over an uplink connection to an aiding satellite positioning system server;
    means for combining located at the data service satellite, wherein the means for combining is for combining the aiding information with data into a data signal at the data service satellite, the data having subscription-based content for communication to a subscriber at a receiver terminal wherein the means for combining the aiding information includes:
    means for receiving the aiding information in at least one data packet, and
    means for directing the data packet containing the aiding information to the downlink interface transmission with data packets containing data; and
    means for continuously broadcasting the data signal to the receiver terminal, wherein the data signal is processed to obtain the aiding information to provide to the SPS receiver.

* * * * *

UNITED STATES PATENT AND TRADEMARK OFFICE
CERTIFICATE OF CORRECTION

PATENT NO. : 7,719,464 B2  
APPLICATION NO. : 11/589668  
DATED : May 18, 2010  
INVENTOR(S) : Ashutosh Pande, Steve Chang and Lars Boeryd Page 1 of 1

It is certified that error appears in the above-identified patent and that said Letters Patent is hereby corrected as shown below:

Column 11, line 34, delete "if"

Column 11, line 37, delete "if"

Signed and Sealed this  
Third Day of May, 2011

David J. Kappos  
*Director of the United States Patent and Trademark Office*

UNITED STATES PATENT AND TRADEMARK OFFICE
CERTIFICATE OF CORRECTION

Page 1 of 1

PATENT NO. : 7,719,464 B2
APPLICATION NO. : 11/589668
DATED : May 18, 2010
INVENTOR(S) : Pande et al.

It is certified that error appears in the above-identified patent and that said Letters Patent is hereby corrected as shown below:

In the Specification

In Column 6, Line 14, delete "receiver 220." and insert -- repeater 220. --, therefor.

In Column 6, Line 65, delete "satellite 203" and insert -- satellite 201 --, therefor.

In Column 6, Line 66, delete "satellite 203" and insert -- satellite 201 --, therefor.

In the Claims

In Column 12, Line 40, in Claim 11, delete "of 9" and insert -- of claim 9 --, therefor.

Signed and Sealed this
Twenty-first Day of April, 2015

Michelle K. Lee
*Director of the United States Patent and Trademark Office*